(12) United States Patent
Hou et al.

(10) Patent No.: US 9,551,634 B2
(45) Date of Patent: Jan. 24, 2017

(54) TESTING APPARATUS FOR TOUCH PANEL AND METHOD FOR USING THE SAME

(71) Applicant: WISTRON CORP., New Taipei (TW)

(72) Inventors: Jian-Wu Hou, New Taipei (TW); Shou-Lun Chang, New Taipei (TW)

(73) Assignee: Wistron Corp., New Taipei (TW)

( * ) Notice: Subject to any disclaimer, the term of this patent is extended or adjusted under 35 U.S.C. 154(b) by 277 days.

(21) Appl. No.: 13/935,540

(22) Filed: Jul. 4, 2013

(65) Prior Publication Data

US 2014/0190282 A1 Jul. 10, 2014

(30) Foreign Application Priority Data

Jan. 10, 2013 (CN) .......................... 2013 1 0009393

(51) Int. Cl.
*G01D 21/00* (2006.01)
*G01M 99/00* (2011.01)
*G01D 18/00* (2006.01)
*G06F 3/041* (2006.01)

(52) U.S. Cl.
CPC ............ *G01M 99/008* (2013.01); *G01D 18/00* (2013.01); *G06F 3/0418* (2013.01)

(58) Field of Classification Search
CPC ...... G01D 11/30; G01D 11/245; G01D 21/00; G01D 11/24; G01N 29/225
USPC ....................................................... 73/866.5
See application file for complete search history.

(56) References Cited

U.S. PATENT DOCUMENTS

| | | | | |
|---|---|---|---|---|
| 421,550 A | * | 2/1890 | Champlin ................ | D05B 7/00 112/26 |
| 422,706 A | * | 3/1890 | Blake ...................... | B02C 15/08 209/273 |
| 6,145,093 A | * | 11/2000 | Shiga .................. | G06F 11/2221 714/5.11 |
| 2010/0283501 A1 | * | 11/2010 | Tsai ........................ | G09G 3/006 324/760.02 |
| 2012/0044158 A1 | * | 2/2012 | Chang ...................... | G06F 8/71 345/173 |

(Continued)

FOREIGN PATENT DOCUMENTS

CN 202351341 U 7/2012
TW M421550 U1 1/2012
(Continued)

OTHER PUBLICATIONS

Touch Panel Test device, TW M421550 A, Feb. 1890, Name not available.*

(Continued)

*Primary Examiner* — Eric S McCall
*Assistant Examiner* — Mohammed E Keramet-Amircolai (57) ABSTRACT

A testing apparatus for a touch panel is disclosed, which includes a control system, a plurality of supporting members and a plurality of contact members. The supporting members are respectively connected to the control system, wherein one side of each of the supporting members includes at least one contact member, which is configured to be used to touch the touch panel. The contacting members are capable of being moved relative to the touch panel when the supporting members are driven by the control system. Also a method for using the same apparatus is disclosed.

9 Claims, 8 Drawing Sheets

(56) References Cited

U.S. PATENT DOCUMENTS

2012/0280934 A1* 11/2012 Ha ..................... G06F 11/2221
  345/174
2013/0278539 A1* 10/2013 Valentine ................ G06F 3/044
  345/174

FOREIGN PATENT DOCUMENTS

| TW | M422706 U1 * | 1/2012 | ............. G06F 3/041 |
| TW | M421550 U2 * | 2/2012 | ............. G06F 3/041 |
| TW | M422706 U1 | 5/2012 | |

OTHER PUBLICATIONS

Multi-finger multi-touch panel line probe sheet structure improved, Mar. 1890, TW-M422706, Name not available.*
Taiwan Patent Office, Office Action, Patent Application Serial No. 102103437, Jun. 23, 2014, Taiwan.
China Patent Office, Office Action, Patent Application Serial No. 201310009393.8, Jul. 4, 2016, China.

* cited by examiner

TESTING APPARATUS FOR TOUCH PANEL AND METHOD FOR USING THE SAME

CROSS REFERENCE TO RELATED APPLICATIONS

This Application claims priority of China Patent Application No. 201310009393.8, filed on Jan. 10, 2013, the entirety of which is incorporated by reference herein.

BACKGROUND OF THE INVENTION

Field of the Invention

The present in elates to a testing apparatus for a touch and a method for using the same, and more particularly, to a testing apparatus for a touch panel which has a multi-point testing function and a method using the same.

Description of the Related Art

Touch panels are popular input devices. When a user touches a certain position on the touch panel, corresponding to text or the images on a display device, the touch panel senses signals and transmits them to a controller for signal processing. There are several types of touch panels, for example, resistive types, capacitive types, infrared types, surface acoustic wave types, etc. For instance, the capacitive touch panels detect the difference of capacitance of the touch panel. When a user touches the touch panel, the capacitance at the corresponding position changes. Therefore, when the user touches different positions of the touch panel, the controller calculates the differences in capacitance and then outputs corresponding signals.

Generally, after the touch panel has been manufactured, linearity testing is done to inspect if the touch panel meets performance and quality requirements. The linearity testing is carried out by an apparatus, wherein a contacting member is positioned on the touch panel to actually touch and depress the surface of the touch panel. Meanwhile, the signal of the detected touches by the touch panel is then transmitted to a testing system for analysis. Based on the results of the analysis, a determination is made as to whether the touch panel has met the performance and quality requirements.

BRIEF SUMMARY OF THE INVENTION

In this regard, the disclosure provides a testing apparatus for a touch panel, so as to facilitate a linearity testing for the touch panel.

The testing apparatus according to one embodiment of the disclosure includes a control system, a plurality of supporting members, and a plurality of contacting members. The plurality of supporting members are respectively connected to the control system, and the plurality of contacting members are respectively connected to a first side of each of the plurality of supporting members for touching the touch panel. The plurality of contacting members move relative to the touch panel when the plurality of supporting members is driven by the control system.

The disclosure also provides a method using the testing apparatus as mentioned above, wherein the method includes: positioning the testing apparatus above the touch panel; adjusting a distance between the testing apparatus and the touch panel so as to enable the plurality of contacting members to be in contact with the touch panel; and driving the plurality of supporting members by the control system to facilitate movement of the plurality of contacting members on the touch panel.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the contemplated mode of carrying out the invention. This description is made for the purpose of illustrating the general principles of the invention and should not be taken in a limiting sense. The scope of the invention is determined by reference to the appended claims.

Figure 1:
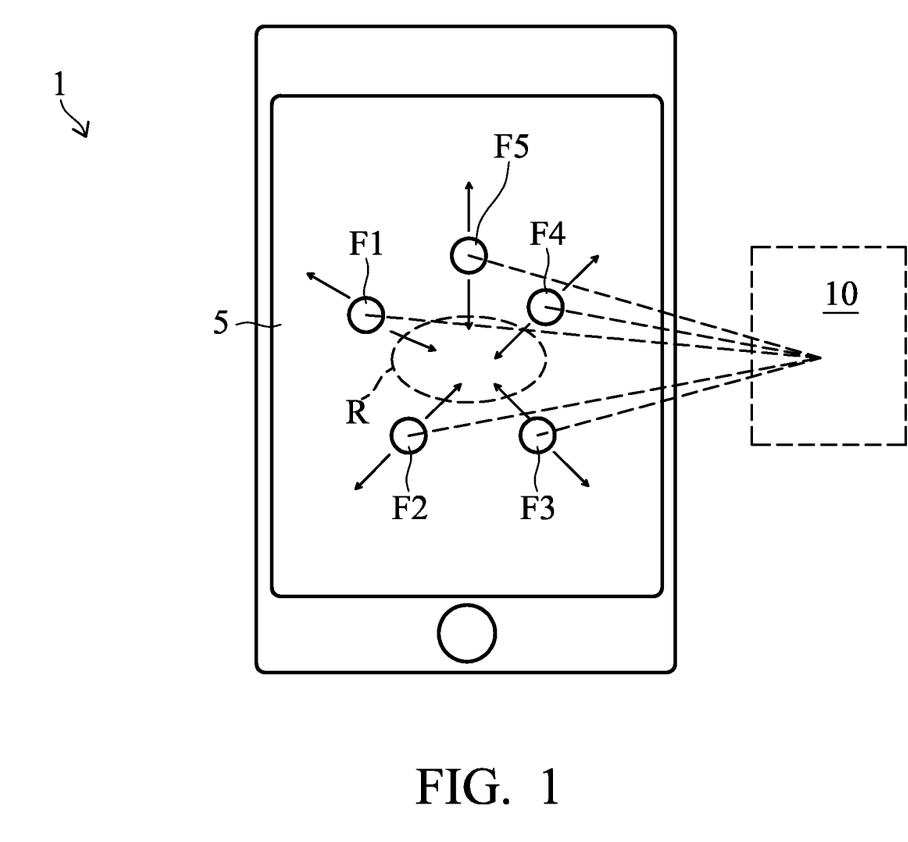
FIG. 1 shows a schematic view of a testing apparatus of one embodiment of the disclosure while implementing a test for a touch panel.

Referring to FIG. 1, the testing apparatus 10 of the disclosure is adapted to implement testing for a touch panel 5 of an electronic device 1 to determine if the touch panel 5 meets performance and quality requirements. The operation of the electronic device 1 may correspond to the movement of a user's finger (or stylus) as the finger is moved along a surface of the touch panel 5 of the electronic device 1. Thus, for example, the image object may be enlarged (or reduced) or a particular program may be performed in response to the touch event on the touch panel 5. The electronic device 1 may be a smartphone, a tablet, or a laptop. In one embodiment, there are five touch points F1, F2, F3, F4, and F5 produced at a periphery of a reference region R on the touch panel 5, wherein each of the five touch points F1, F2, F3, F4, and F5 represents a distinct touch formed from a testing apparatus 10 touching the touch panel 5. The five touch points F1, F2, F3, F4, and F5 are controlled by the testing apparatus 10 to horizontally move toward or away from the reference region R as indicated by the arrows. The touch signal detected by the touch panel 5 is then transmitted to the testing system (not shown) for analysis, to determine whether the touch panel meets performance and quality requirements.

Figure 2:
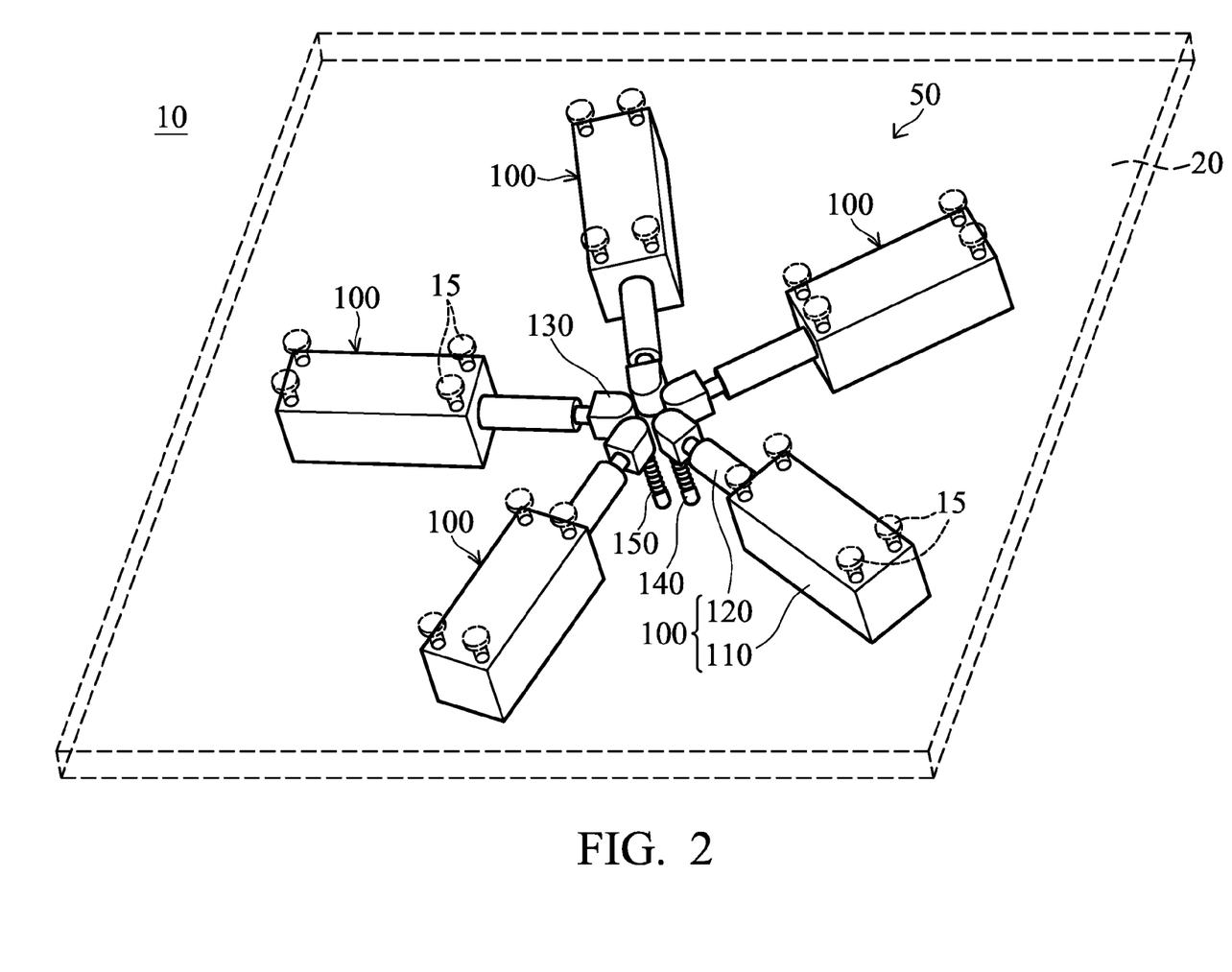
FIG. 2 shows a schematic view of the testing apparatus of one embodiment of the disclosure.

Referring to FIG. 2, the structural features of the testing apparatus 10 are illustrated in detail hereinafter. The testing apparatus 10 in accordance with one embodiment of the disclosure includes a base 20, a control system 50, five supporting members 130, five contacting members 140 (only partially shown), and five flexible members 150 (only partially shown). The control system 50 includes a control computer (not shown) and five driving devices 100 which are fixed on the base 20 through screws 15, wherein each of the five driving devices 100 includes a piston 110 and a rod 120. Each of the rods 120 extends outwardly from one of the pistons 110 and is controlled by the piston 110. Away from the corresponding piston 110, the five supporting members 130 are respectively disposed on one end of each of the rods 120. The five supporting members 130 are configured to connect with the five contacting members 140. As shown in FIG. 2, in the embodiment, the five supporting members 130 are disposed around a center and spaced apart by the same distance, but it should not be limited thereto. In one non-illustrated embodiment, the five supporting members 130 are adjacently disposed along one direction. In another non-illustrated embodiment, the five supporting members 130 are disposed around a center and spaced apart by different distances.

Figure 3A:
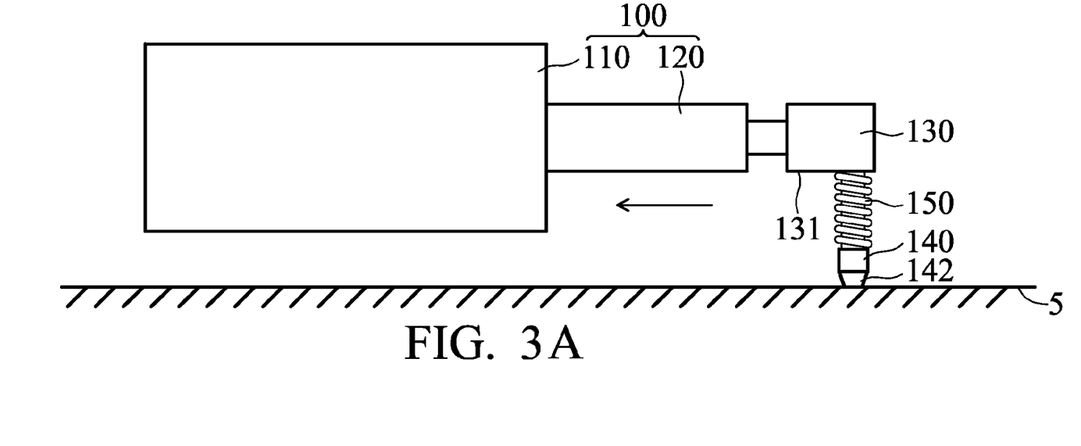
FIG. 3A shows a side view of partial elements of the testing apparatus of FIG. 2, wherein a contacting member is in contact with the touch panel.
Figure 3B:
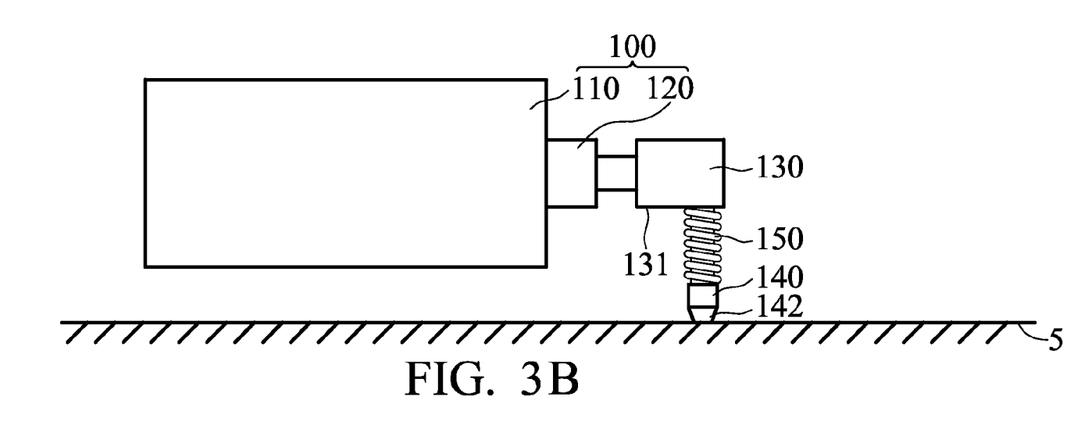
FIG. 3B shows a side view of partial elements of the testing apparatus of FIG. 2, wherein the contacting member is in contact with the touch panel.

Referring to FIG. 3, each of the five contacting members 140 is disposed on a first side 131 of each of the five supporting members 130 in a retractable manner, wherein the first side 131 of each of the five supporting members 130 faces the touch panel 5 while the testing apparatus 10 is adapted to implement testing for a touch panel 5. To implement testing, the end portions 142 of the five contacting members 140 are preferably to touching the touch panel 5 at the same time. Otherwise, the touch panel 5 may be damaged due to uneven pressure. To prevent damage of the touch panel 5, the five flexible members 150, respectively surrounding the outer surface of one of the five contacting members 140, are accordingly connected between the supporting member 130 and the corresponding contacting members 140. Therefore, uneven pressure may be absorbed by the five flexible members 150 if the five contacting members 140 touch the touch panel 5 at different times.

Returning to FIG. 1 and also referring to FIGS. 2, 3A, and 3B, the operation method of the testing apparatus 10 is illustrated hereinafter. When the testing apparatus 10 is adapted to implement testing for the touch panel 5, the testing apparatus 10 is positioned above the touch panel 5. Next, a distance between the testing apparatus 10 and the touch panel 5 is adjusted until the end portions 142 of the five contacting members 140 are in contact with the touch panel 5, wherein the five touch points F1, F2, F3, F4, and F5, formed from the end portions 142, are represented on the touch panel 5. At the same time, the five supporting members 130 are driven by the pistons 110 of the five diving devices 100 so that the end portions 142 of the five contacting members 140 move relative to the touch panel 5. Since the end portions 142 of the five contacting members 140 are horizontally moved on the touch panel 5, the five touch points F1, F2, F3, F4, and F5 are able to move toward or away from the reference R region (as indicated by the arrows).

It should be noted that in the embodiment, since each of the contacting members 140 is controlled by a single driving device 100, distances between the reference region R and each of the five touch points F1, F2, F3, F4, and F5 may be the same or different. Additionally, moving speeds of each of the five touch points F1, F2, F3, F4, and F5 may be the same or different. That is the positions of the five touch points F1, F2, F3, F4, and F5 are respectively controlled.

Figure 4:
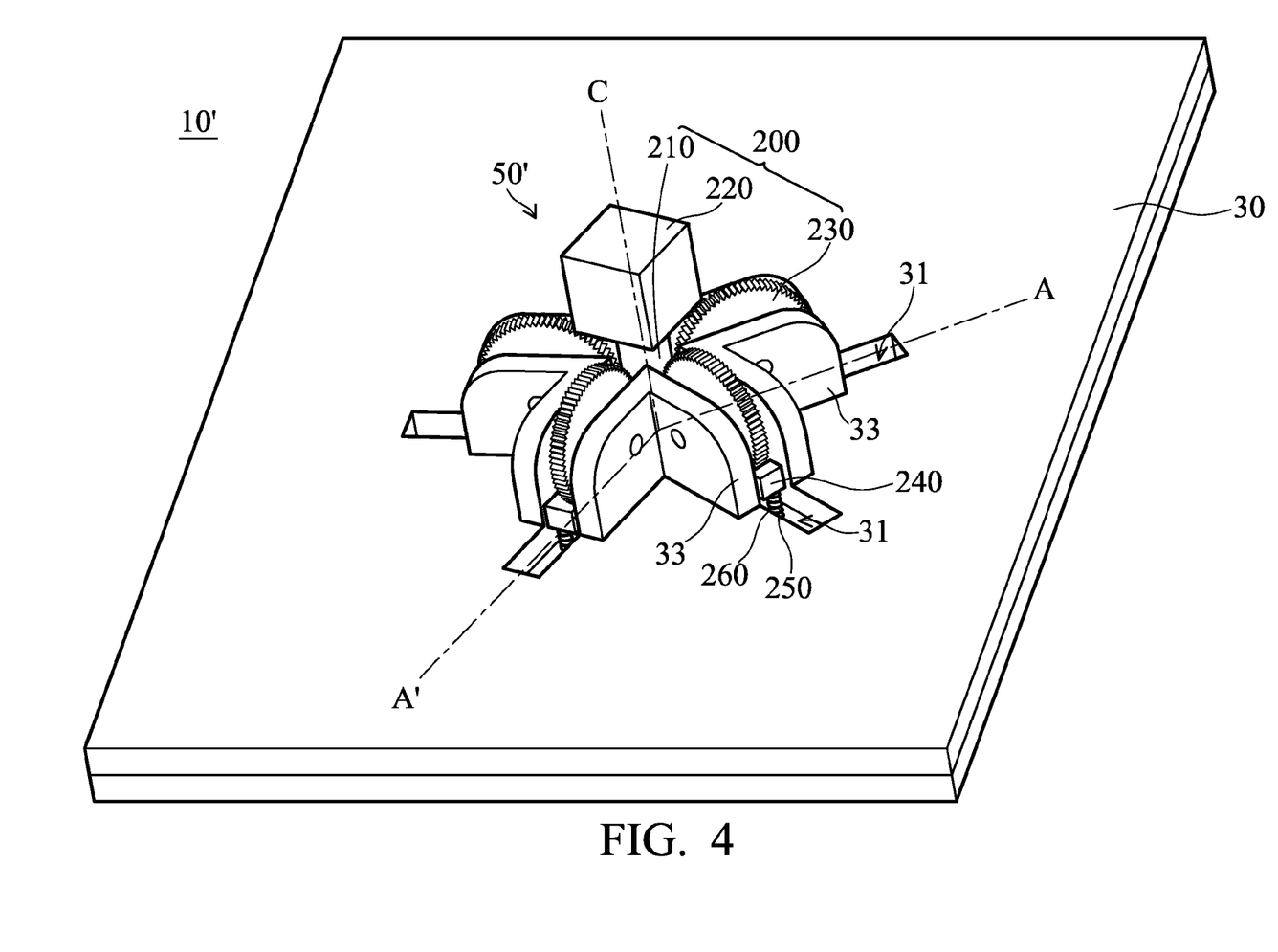
FIG. 4 shows a schematic view of a testing apparatus of another embodiment of the disclosure.

Referring to FIG. 4, the structural features of a testing apparatus 10' in accordance with another embodiment of the disclosure are described in detail hereinafter. The testing apparatus 10' includes a base 30, a control system 50', five supporting members 240, five contacting members 250 (only partially shown), and five flexible members 260 (only partially shown). Five openings 31 (only partially shown) extending outwardly from a reference line C are disposed on the base 30, and the base 30 includes five supporting members 33 (only partially shown) respectively corresponding to one of the five openings 31. The control system 50' includes a control computer (not shown) and a driving device 200 disposed on the base 30, wherein the driving device 200 includes, for example, a screw rod 210, a motor 220, and five gear wheel 230 (only partially shown).

Figure 5A:
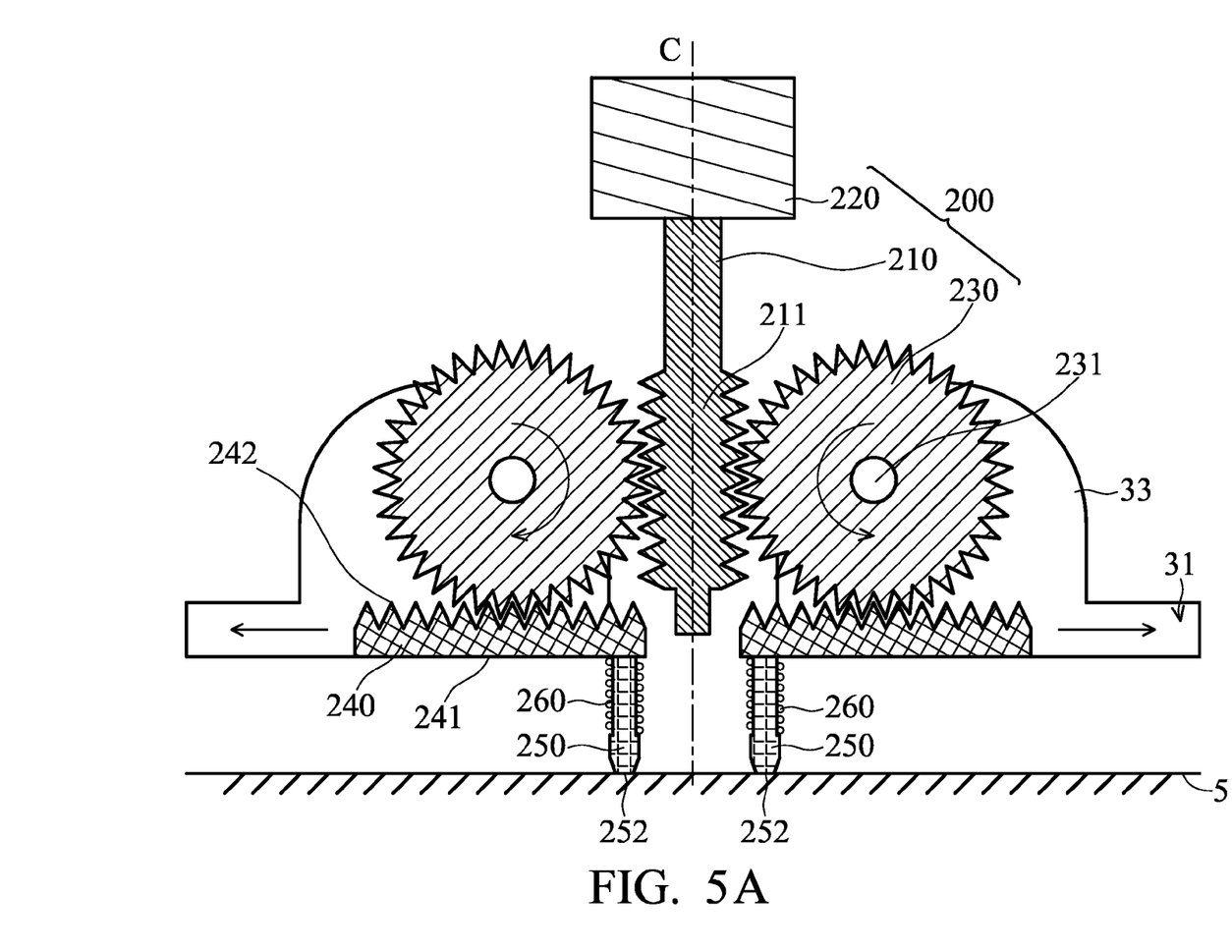
FIG. 5A shows a sectional view of the testing apparatus of FIG. 4 taken along line A-A', wherein a contacting member is in contact with the touch panel.

As shown in FIG. 5A, the screw rod 210 is disposed along the reference line C, and the screw rod 210 is connected with the motor 220 and driven by the motor 220 to rotate. The five gear wheels 230 (FIG. 4) respectively correspond to one of the five openings 31 and are disposed around the screw rod 210, wherein a shaft 231 of each of the gear wheels 230 is connected to one of the five supporting members 33, and each of the gear wheels 230 is engaged with screw portion 211 of the screw rod 210. The five gear wheels 230 may be simultaneously driven by the screw rod 210 to rotate on the five supporting members 33.

Each of the five supporting members 240 includes a gear rack 242, wherein the five supporting members 240 are connected to the five gear wheels 230 via the gear racks 242 thereof. The fives contacting members 250 are respectively disposed on a first side 251 (opposite to a side of the supporting member 240 which includes the gear rack 242) of each of the five supporting members 240 in a retractable manner. While testing the touch panel, the end portions 252 of the five contacting members 250 are preferably to touch the touch panel 5 at the same time. Otherwise, the touch panel 5 may be damaged due to uneven pressure. To prevent damage to the touch panel 5, the five flexible members 260, respectively surrounding the outer surface of one of the five contacting members 250, are accordingly connected between the supporting member 240 and the corresponding contacting members 250. Therefore, the uneven pressure can be absorbed by the five flexible members 260 if the five contacting members 250 touch the touch panel 5 at different times.

Figure 5B:
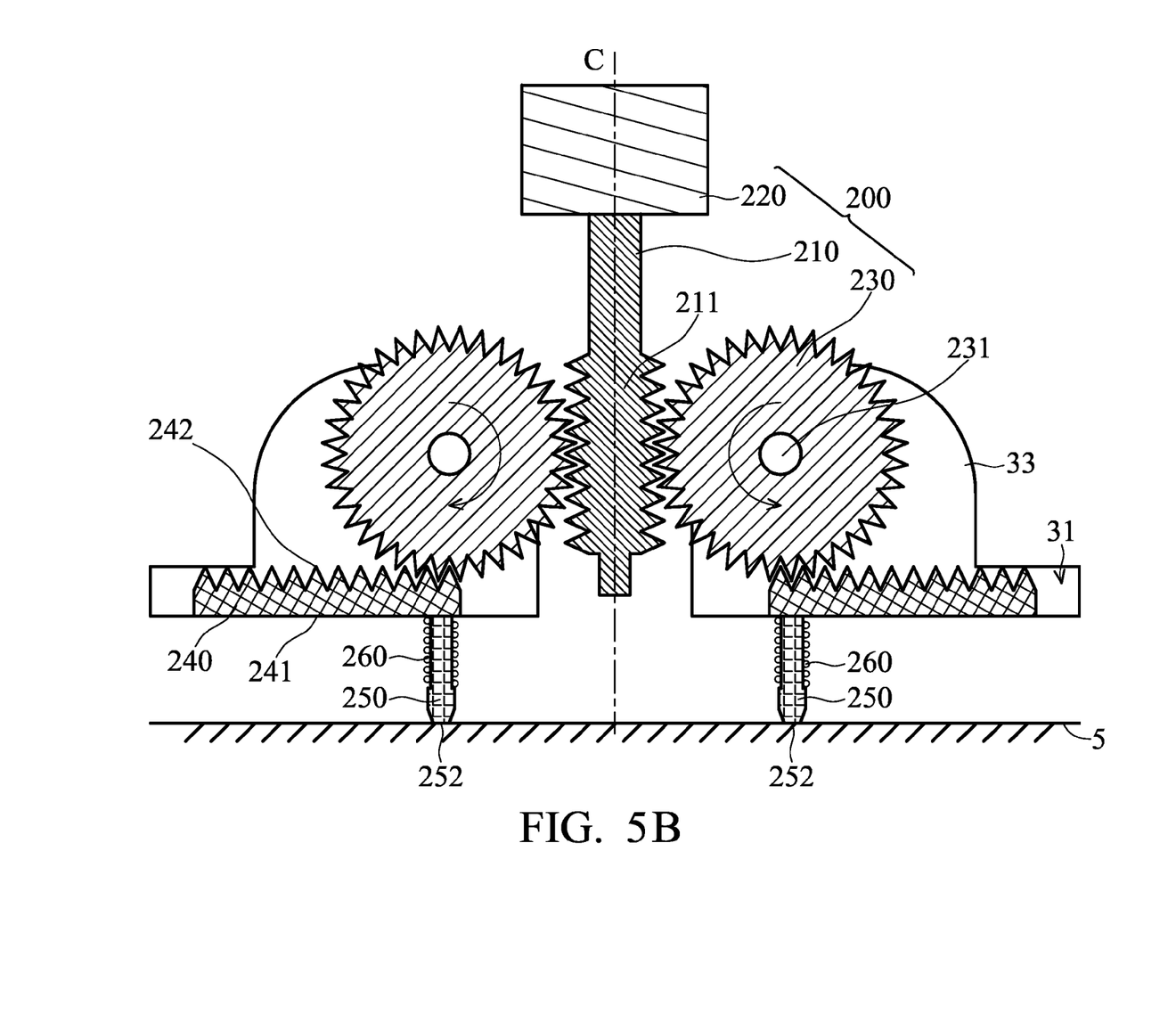
FIG. 5B shows a sectional view of the testing apparatus of FIG. 4 taken along line A-A', wherein the contacting member is in contact with the touch panel.

Returning to FIG. 1 and referring to FIGS. 4, 5A, and 5B, the operation method of the testing apparatus 10' is described hereinafter. When the testing apparatus 10' is adapted to implement testing for the touch panel 5, the testing apparatus 10' is positioned above the touch panel 5. Next, a distance between the testing apparatus 10' and the touch panel 5 is adjusted until the end portions 252 (FIG. 5A) of the five contacting members 250 are in contact with the touch panel 5 wherein the five touch points F1, F2, F3, F4, and F5, formed from the end portions 252, are represented on the touch panel 5. While at the same time, power from the motor 220 of the driving device 200 are transmitted to the five contacting members 250 via the screw rod 210, the gear wheel 230, and supporting member 240 to drive the end portions 252 moving on the touch panel 5. For example, the end portions 252 of the five contacting members 250 are horizontally moved on the touch panel 5 so as to move the five touch points F1, F2, F3, F4, and F5 toward or away from the reference R region (as indicated by the arrows).

In the embodiment, since the five supporting members 240 are driven by a single driving device 200 and connected to the driving device directly, the positions of the five touch points F1, F2, F3, F4, and F5 are controlled simultaneously. However, it is appreciated that while the five touch points F1, F2, F3, F4, and F5 are controlled simultaneously, distances between the reference region R and each of the five touch points F1, F2, F3, F4, and F5 may be the same or different from one another, and moving speeds of each of the five touch points F1, F2, F3, F4, and F5 may be the same or different from one another. For example, the distances between the reference region R and each of the five touch points F1, F2, F3, F4, and F5 may be different from one another by adjusting the distance between each of the five contacting members 250 and the reference line C. In another example, the moving speeds of each of the five touch points F1, F2, F3, F4, and F5 may be different from one another by displacing different gear wheels 230 with different diameters, so that the rotation speeds of the five gear wheel 230 may be different, even if the five gear wheels 230 are driven by the same screw rod 210.

Figure 6:
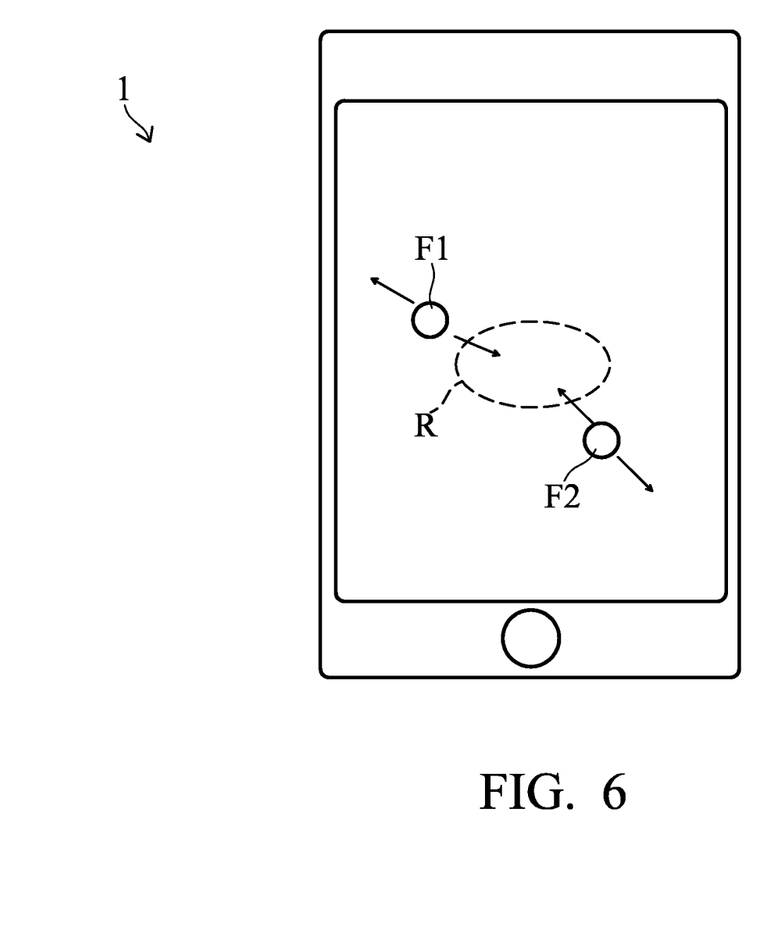
FIG. 6 shows a schematic view of a testing apparatus of yet another embodiment of the disclosure.
Figure 7:
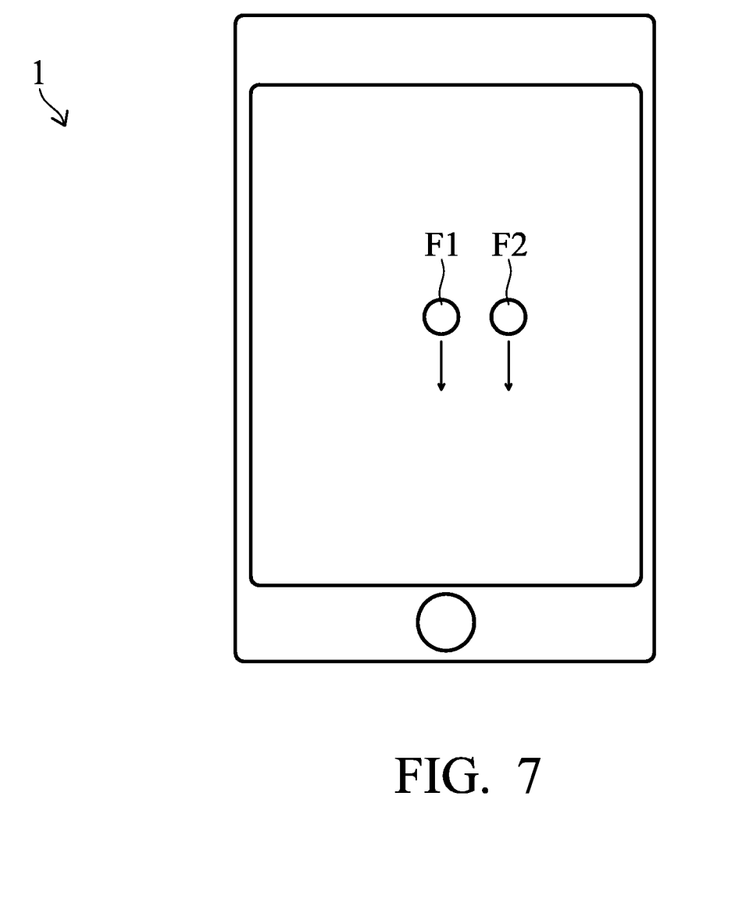
FIG. 7 shows a schematic view of a testing apparatus of still yet another embodiment of the disclosure.

Note that while the testing apparatus in the above-mentioned embodiments include five contacting members, but it should not be limited thereto. The numbers of the contacting members can be modified according to demand. As shown in FIG. 6, in some embodiments, the testing apparatus may include two contacting members which are driven by any one of the driving devices described above. Thus, two contacting points F1 and F2 formed from the two contacting members are represented on the touch panel 5, wherein the two contacting points F1 and F2 are moved toward or away from the reference R region in response to the control of the driving device. In yet another embodiment, the two contacting points F1 and F2 which are adjacent to each other may be moved toward the same direction, so as to achieve the objective of a multi-point touch test.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A testing apparatus, adapted to implement testing for a touch panel, the testing apparatus comprising:
    a control system;
    a plurality of supporting members, respectively connected to the control system; and
    a plurality of contacting members, wherein the contacting members are respectively connected to a first side of each of the plurality of supporting members and configured to touch the touch panel,
    the testing apparatus arranged such that the plurality of contacting members are in contact with the touch panel and move relative to the touch panel when the plurality of supporting members are driven by the control system,
    wherein the plurality of contacting members are located at a periphery of a reference region of the touch panel and move along different radial directions relative to a center of the reference region when the plurality of contacting members are driven by the control system, and the supporting members are arranged around the center of the reference region.

2. The testing apparatus as claimed in claim 1, further comprising a plurality of flexible members, wherein each of the plurality of flexible members is connected to one of the plurality of contacting members and one of the corresponding supporting members.

3. The testing apparatus as claimed in claim 1, wherein the control system comprises a plurality of driving devices arranged around the center of the reference region, and the plurality of contacting members are independently driven by one of the plurality of driving devices to move relative to the center of the reference.

4. The testing apparatus as claimed in claim 3, wherein each of the plurality of driving devices comprises a piston and a rod, and each of the plurality of supporting members is driven by the piston via the rod to move relative to the center of the reference region in a direction parallel to a surface of the touch panel touched by the contacting members.

5. The testing apparatus as claimed in claim 1, wherein the control system comprises a single driving device, and the plurality of supporting members are directly connected to the driving device.

6. The testing apparatus as claimed in claim 5, wherein the driving device comprises:
    a motor;
    a screw rod, connected to the motor; and
    a plurality of gear wheels, surrounding the screw rod and respectively engaging with the screw rod, wherein each of the plurality of supporting members comprises a gear rack, and the plurality of gear racks are connected to one of the plurality of gear wheels, respectively.

7. A method of using the testing apparatus as claimed in claim 1, comprising:
    positioning the testing apparatus above the touch panel;
    adjusting a distance between the testing apparatus and the touch panel so as to enable the plurality of contacting members to be in contact with the touch panel; and
    driving the plurality of supporting members by the control system to facilitate movement of the plurality of contacting members on the touch panel.

8. The testing apparatus as claimed in claim 7, wherein distances between each of the plurality of contacting members and the center of the reference region are different.

9. The testing apparatus as claimed in claim 7, wherein distances between each of the plurality of contacting members and the center of the reference region are the same.

* * * * *